United States Patent [19]

Gilmont

[11] 4,173,890
[45] Nov. 13, 1979

[54] BY-PASS FLOWMETER

[75] Inventor: Roger Gilmont, Douglaston, N.Y.

[73] Assignee: Gilmont Instruments, Inc., Great Neck, N.Y.

[21] Appl. No.: 952,305

[22] Filed: Oct. 18, 1978

[51] Int. Cl.[2] ............................................... G01F 5/00
[52] U.S. Cl. ........................................ 73/202; 73/209
[58] Field of Search ................. 73/209, 202, 203, 210, 73/208

[56] References Cited

U.S. PATENT DOCUMENTS

| 185,001 | 12/1876 | Wasmandorff | 73/202 |
| 2,003,474 | 6/1935 | Schweitzer | 73/208 |
| 2,043,636 | 6/1936 | Thompson | 73/202 |
| 2,370,634 | 3/1945 | Brewer | 73/209 |
| 2,439,614 | 4/1948 | Schramm | 73/196 |
| 3,605,496 | 9/1971 | Wenham | 73/202 |

Primary Examiner—Jerry W. Myracle
Attorney, Agent, or Firm—James & Franklin

[57] ABSTRACT

A by-pass flowmeter of coaxial design comprises a transparent outer tube and a rotameter coaxially disposed within the outer tube and laterally spaced therefrom to define an annular by-pass chamber. An inlet is at least partially disposed within one end of the outer tube in fluid communication with both the rotameter inlet and an adjacent portion of the by-pass chamber while an outlet is at least partially disposed within the other end of the outer tube in fluid communication with both the rotameter outlet and an adjacent end portion of the by-pass chamber. As the by-pass flowmeter is of coaxial design, greater accuracy is obtainable than with by-pass flowmeters of non-coaxial design.

12 Claims, 2 Drawing Figures

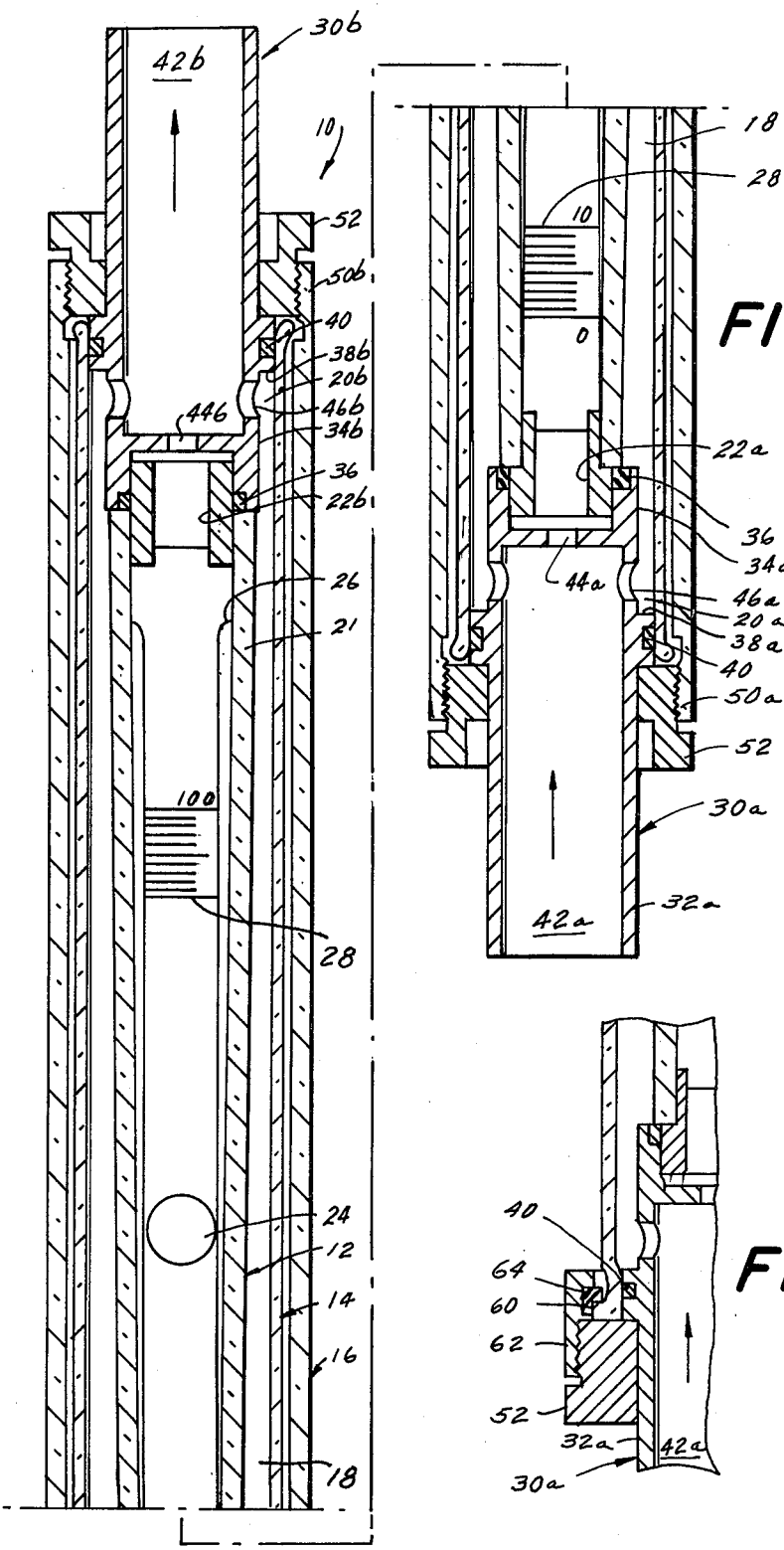

BY-PASS FLOWMETER

BACKGROUND OF THE INVENTION

The present invention relates to by-pass flowmeters and more particularly to by-pass flowmeters incorporating a rotameter.

In a rotameter the stream of fluid to be measured is made to pass through a constriction, the constriction being arranged so that its size is varied to accommodate the flow while the differential head or pressure drop is held constant. The variation of the opening (that is, the degree of constriction) is automatically brought about by the motion of a weighted piston or float supported by the fluid. More particularly, the rotameter consists essentially of a plummet or metering float which is free to move in a vertical, slightly tapered tube with the small end down. The fluid enters the lower end of the tube and causes the plummet to rise until the annular area between the plummet and the wall of the tube is such that the pressure drop across this constriction is just sufficient to support the plummet. Typically, the tapered tube is of glass and carries a linear scale thereon through which the position of the floating plummet is correlated with the flow rate.

Where the volume of flow to be measured is large, however, it is customary to use a by-pass flowmeter in order to keep the size of the rotameter itself within practical limits. In such a by-pass flowmeter incorporating a rotameter, the fluid flow through the flowmeter is divided into two streams, one through a tube containing the rotameter and the other through a chamber able to accommodate a much larger flow than the rotameter. By means of inlet and outlet orifices to both paths, a small volume of the total flow passes through the rotameter while the remaining larger volume passes through the chamber. If the two flows are in parallel, the pressure drop across each is the same as the total pressure drop across the flowmeter.

To date, by-pass flowmeters have positioned the rotameter or other measuring device not in the center of the total flow through the flowmeter, but rather to one side thereof. Frequently the rotameter has been placed in a by-pass chamber outside of the main flow (but connected thereto by suitable tubing) so that the readings of the rotameter may be made easily visible through a transparent wall of the by-pass chamber while the main flow chamber is constructed of opaque material. In other cases the rotameter is disposed within the main flow chamber, but against the wall thereof, presumably to facilitate reading of the rotameter. Whatever the reasons for the conventional design, the result is that either the rotameter reading is indicative of the pressure drop to one side of the center of the main flow (and this may differ from the pressure drop in the center of the main flow) or the rotameter reading reflects the pressure drop occurring in the center of the main flow, but only as that pressure drop is also affected by the twists and turns of the tubing connecting the rotameter inlet and outlet to the center of the main flow. The former situation occurs when the tubing connecting the rotameter inlet and outlet to the main flow chamber is linear, but the connections terminate at points other than the center of the main flow; the latter situation occurs when the tubing connects the rotameter inlet and outlet to the center of the main flow chamber, but the tubing is not linear. In either case, the reading of the rotameter is not truly indicative of the main portion of the flow rate. Furthermore, compensation of these inaccuracies by way of calibration is rendered exceedingly difficult, if not impossible, as the degree of inaccuracy thus introduced varies as the range of flow rates varies.

Accordingly, it is an object to provide a by-pass flowmeter of enhanced accuracy.

Another object is to provide such a flowmeter whose readings accurately reflect only the pressure drop across the central portion of the main flow.

A further object is to provide such a flowmeter which is compact, inexpensive and easy to use.

SUMMARY OF THE INVENTION

The above and related objects of the present invention are obtained in a by-pass flowmeter of coaxial design. The flowmeter comprises an outer tube having a viewing station and a rotameter coaxially disposed within the outer tube to define therewith an annular by-pass chamber. The rotameter and by-pass chamber each include a fluid inlet and a fluid outlet. An inlet means is at least partially disposed within the outer tube and in fluid communication with both the rotameter inlet and the by-pass chamber inlet. An outlet means is at least partially disposed within the outer tube and in fluid communication with both the rotameter outlet and the by-pass chamber outlet. As the rotameter is coaxially disposed within the outer tube, and hence within the annular by-pass chamber, its readings accurately reflect the pressure drop occurring in the center of the main flow.

A protective cylinder with a viewing station may be disposed about the outer tube, the cylinder extending at least over the entire length of the outer tube. Means are provided for connecting each end of the cylinder to an adjacent one of the inlet and outlet means. Typically the cylinder may be formed of polycarbonate, the outer tube of glass, the connecting means of polypropylene, and the inlet and outlet means of polytetrafluoroethylene.

In a preferred embodiment each of the inlet and outlet means is of generally tubular configuration and has an end extending beyond an adjacent one of the ends of the outer tube. Each defines a first opening in the extending end thereof, a second opening in the opposite end thereof communicating with the rotameter, and one or more apertures in the sidewall thereof communicating with the by-pass chamber. The apertures and the second openings are preferably configured and dimensioned to divide the flow about 20% through the rotameter and 80% through the by-pass chamber.

BRIEF DESCRIPTION OF THE DRAWING

FIG. 1 is a side elevation view in cross-section of an embodiment of the flowmeter according to the present invention incorporating a protective outer cylinder; and FIG. 2 is a fragmentary side elevation view, in cross-section, of one end of an embodiment of the flowmeter not incorporating a protective outer cylinder.

DETAILED DESCRIPTION OF THE PREFERRED EMBODIMENTS

Referring now to the drawing, and in particular to FIG. 1 thereof, therein illustrated is a by-pass flowmeter according to the present invention, generally designated 10. The flowmeter 10 is basically comprised of three coaxially disposed tubular members; a rotameter generally designated 12, an outer tube generally designated 14 and a protective cylinder generally designated 16. The rotameter 12 is coaxially disposed within the outer tube 14 and laterally spaced therefrom to define therewith an annular by-pass chamber 18 having a fluid inlet 20a and a fluid outlet 20b.

The rotameter 12 is of conventional design and includes a generally cylindrical member 21 having a fluid inlet 22a at the bottom thereof, a fluid outlet 22b at the top thereof, and a ball or plummet 24 disposed therein. Member 21 is typically formed of glass or some other transparent material. The outer surface of member 21 is substantially cylindrical while the inner surface thereof gradually tapers upwardly and outwardly. The member 21 further includes a plurality of inwardly projecting beads 26 extending for the greater length thereof. The beads 26 define a raceway of constant diameter for the plummet 24 and thus serve to maintain the plummet 24 in the center of the member 21. Scale markings 28 are disposed on member 21 and correlate a given height of the plummet 24 with a given flow rate. As the rotameter is conventional in design, a further description thereof is not deemed necessary.

The inlet means generally designated 30a is of generally tubular configuration and has one end 32a thereof projecting beyond the adjacent end of outer tube 14 (and protective cylinder 16) and adapted for connection to the fluid supply conduit (not shown) and an opposite end 34a disposed within the outer tube 14 and forming a fluid-tight connection with the rotameter fluid inlet 22a with the assistance of an O-ring 36. The inlet means 30a additionally includes an outwardly extending flange 38a which forms a fluid-tight connection to the outer tube 14 with the aid of an O-ring 40. The projecting inlet end 32a defines an opening 40a adapted for connection to the fluid supply, an opening 44a in the opposite end thereof in fluid communication with the rotameter fluid inlet 22a, and a diametrically opposed spaced pair of apertures 46a in the sidewall thereof communicating with the by-pass chamber fluid inlet 20a.

Structurally the outlet means 30b is substantially similar to the inlet means 30a and is identified by similar numerals followed by the letter "b". The projecting outlet end 30b is adapted for connection to the fluid discharge conduit (not shown), and the opposite end 34b forms a fluid-tight connection with the rotameter fluid outlet 22b. The opening 40b in projecting end 32b is adapted for connection to the fluid discharge, the opening 44b in the opposite end 34b is in fluid communication with the rotameter fluid outlet 22b, and the apertures 46b in the sidewall communicate with the by-pass chamber fluid outlet 20b. It will be appreciated that the inlet and outlet means openings 44a and 44b are in direct linear fluid communication through the rotameter inlet and outlet 22a, 22b and that this direct linear flow is in the center of the flow to be measured (that is, the flow entering through the aperture 42a of the inlet means 30a and leaving through the aperture 42b of the outlet means 30b).

While the inlet and outlet means 30a and 30b are shown as having only a spaced pair of apertures 46a, 46b in the sidewall, obviously a different number of such apertures may be used or the cross-sectional configurations of the apertures 46a, 46b may be varied in order to obtain an appropriate division of the flow through the rotameter 12 and through the by-pass chamber 18. Generally it is desirable to divide the flow about 20% through the rotameter 12 and about 80% through the by-pass chamber 18, although other division ratios (e.g., 33%/67%) may be employed.

The protective cylinder 16 is disposed about the outer tube 14 and extends at least the entire length thereof. Each end portion 50a, 50b thereof is internally threaded and adapted to be connected to a respective inlet or outlet means 30a, 30b by a bushing 52 snugly fitting on the respective inlet or outlet means 30a, 30b and provided with an externally threaded surface adapted to engage the internally threaded end portions 50a, 50b.

The protective cylinder 16 is preferably coaxially disposed about the outer tube 14 and may be formed of any material suitable for protection of the outer tube 14. Where the fluid passing through the flowmeter is not particularly corrosive, the outer tube 14 may be dispensed with entirely and the by-pass chamber 18 formed intermediate the protective cylinder 16 and the rotameter 12, with O-rings being appropriately placed to insure a fluid-tight connection between the bushings 52 and the protective cylinder 16.

The outer tube 14 and protective cylinder 16 each include aligned viewing stations so tht the full range of operative positions of the plummet 24 may be viewed from outside of the flowmeter 10. Preferably the outer tube 14 and protective cylinder 16 are formed of transparent materials (as shown), in which case the entire outer tube 14 or cylinder 16 constitutes the viewing station. For example, the protective cylinder 16 is preferably formed of transparent polycarbonate and the outer tube 14 is preferably formed of glass. The inlet and outlet means 30a, 30b are preferably formed of polytetrafluorethylene so that the fluid flow is in contact only with glass and polytetrafluorethylene. The bushings 52 are preferably formed of corrosion-resistant polypropylene. The ball or plummet 24 may be formed of glass, stainless steel, ect., depending on the nature of the fluid passing through the rotameter and the desired operative range of the flowmeter.

Referring now to FIG. 2, therein indicated is an embodiment 10' of the flowmeter not utilizing a protective cylinder 16. The flowmeter 10' is essentially similar to the flowmeter 10 of the first embodiment, except that the ends of the outer tube 14 contain outwardly extending flanges 60 which are secured by nut 62 to the bushing 52. A resilient insert 64 is preferably disposed between portions of flange 60 and nut 62 to protect the outer tube 14 against breakage.

To summarize, the present invention provides a compact, inexpensive, easily operated by-pass flowmeter of enhanced accuracy. Its readings accurately reflect only the pressure drop across the central portion of the main flow because the rotameter is coaxially disposed within the main flow.

Now that the preferred embodiments of the present invention have been shown and described in detail, various modifications and improvements thereon will become readily apparent to those skilled in the art. Accordingly, the spirit and scope of the present invention is to be limited only by the appended claims, and not by the foregoing disclosure.

I claim:
1. A by-pass flowmeter of coaxial design comprising:
 (A) an outer tube having a viewing station;
 (B) a rotameter coaxially disposed within said outer tube to define therewith an annular by-pass chamber, said rotameter and said by-pass chamber each including a fluid inlet and a fluid outlet;

(C) inlet means at least partially disposed within said outer tube and in fluid communication with both said rotameter inlet and said by-pass chamber inlet; and (D) outlet means at least partially disposed within the outer tube and in fluid communication with both said rotameter outlet and said by-pass chamber outlet.

2. The flowmeter of claim 1 additionally including a protective cylinder with a viewing station disposed about said outer tube and extending substantially the entire length thereof, and means for connecting each end of said cylinder to an adjacent one of said inlet and outlet means.

3. The flowmeter of claim 2 wherein said cylinder is transparent.

4. The flowmeter of claim 3 wherein said cylinder is polycarbonate.

5. The flowmeter of claim 2 wherein said cylinder is coaxially disposed about said outer tube.

6. The flowmeter of claim 2 wherein said connecting means is a polypropylene bushing.

7. The flowmeter of claim 1 wherein said outer tube is transparent.

8. The flowmeter of claim 7 wherein said outer tube is glass.

9. The flowmeter of claim 1 wherein said inlet and outlet means are polytetrafluroethylene.

10. The flowmeter of claim 1 wherein each of said inlet and outlet means is of generally tubular configuration, has an end extending beyond an adjacent one of the ends of said outer tube, and defines a first opening in the extending end thereof, a second opening in the opposite end thereof communicating with said rotameter and an aperture in the sidewall thereof communicating with said by-pass chamber.

11. The flowmeter of claim 10 wherein said aperture and said second openings are configured and dimensioned to divide the flow about 20% through said rotameter and 80% through said by-pass chamber.

12. The flowmeter of claim 1, wherein said fluid inlets and outlets to said rotameter and said by-pass chamber are configured and dimensioned to divide the flow about 20% through said rotameter and 80% through said by-pass chamber.

* * * * *